United States Patent
Liu et al.

(10) Patent No.: US 6,803,539 B2
(45) Date of Patent: Oct. 12, 2004

(54) SYSTEM AND METHOD OF ALIGNING A MICROFILTER IN A LASER DRILLING SYSTEM USING A CCD CAMERA

(75) Inventors: Xinbing Liu, Acton, MA (US); Chen-Hsiung Cheng, Chelmsford, MA (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 101 days.

(21) Appl. No.: 10/267,021

(22) Filed: Oct. 8, 2002

(65) Prior Publication Data

US 2004/0017429 A1 Jan. 29, 2004

Related U.S. Application Data

(60) Provisional application No. 60/398,529, filed on Jul. 25, 2002.

(51) Int. Cl.[7] ............................................... B23K 26/00
(52) U.S. Cl. ............................ 219/121.71; 219/121.85
(58) Field of Search ...................... 219/121.71, 121.85, 219/121.7

(56) References Cited

U.S. PATENT DOCUMENTS

| | | | |
|---|---|---|---|
| 6,625,181 B1 * | 9/2003 | Oshemkov et al. | ............. 372/9 |
| 6,720,519 B2 * | 4/2004 | Liu et al. | ............... 219/121.61 |
| 2001/0009251 A1 * | 7/2001 | Sekizawa et al. | ...... 219/121.73 |

* cited by examiner

Primary Examiner—M. Alexandra Elve
(74) Attorney, Agent, or Firm—Harness, Dickey & Pierce, PLC

(57) ABSTRACT

A system and method for aligning a microfilter in an optical circuit and thereby providing sub-beam impingement intensity control from a set of highly proximate sub-beams generated from a parallel process laser system removing a portion from a workpiece (exit holes in inkjet nozzle plates). The energy of laser-generated sub-beams to the target (cutting) point is attenuated to a level sufficient for maintaining operation of a charge-coupled-device camera below saturation when the sub-beams are incident on the camera, the CCD camera monitors the sub-beams and directs output to either a monitor or control computer. The microfilter is then adjusted to provide an optimal sub-beam pattern.

12 Claims, 7 Drawing Sheets

SYSTEM AND METHOD OF ALIGNING A MICROFILTER IN A LASER DRILLING SYSTEM USING A CCD CAMERA

CROSS-REFERENCE TO RELATED APPLICATIONS

This application claims the benefit of U.S. Provisional Application No. 60/398,529, filed on Jul. 25, 2002. The disclosure of the above application is incorporated herein by reference.

FIELD OF THE INVENTION

The present invention generally relates to laser drilling and laser milling and particularly relates to microfilter alignment in a laser drilling system.

BACKGROUND OF THE INVENTION

Material ablation by pulsed light sources has been studied since the invention of the laser. Etching of polymers by ultraviolet (UV) excimer laser radiation in the early 1980s led to further investigations and developments in micromachining approaches using lasers—spurred by the remarkably small features that can be drilled, milled, and replicated through the use of lasers. A recent article entitled "Precise drilling with short pulsed lasers" (X. Chen and F. Tomoo, High Power Lasers in Manufacturing, Proceedings of the SPIE Vol. 3888, 2000) outlines a number of key considerations in micromachining. Other recent patents of interest include the following:

U.S. Pat. No. 6,266,198, "Consolidated laser alignment and test station," describes a consolidated laser alignment and test station. In exemplary embodiments, equipment sufficient to perform complete dynamic testing and alignment of a laser transceiver unit is provided in one compact arrangement. As a result, cavity-box efficiency testing, dynamic open-interferometer alignment, dynamic open-case alignment, closed-case laser boresighting, and complete laser functionality and diagnostic testing can be carried out efficiently at a single location. Real-time diagnostic feedback relating to beam quality, radiometry, and temporal behavior is provided so that high-precision laser alignments and repairs can be made quickly and cost effectively. Customized test fixtures provide easy access to every level of the transceiver unit under test, and two cameras provide far-field, near-field, wide-field and receiver-field beam viewing. One camera is combined with a pin-hole lens and a quad step-filter optic attenuator to provide a wide-field beam-finder assembly enabling an operator to quickly align the laser under test to the narrower field of the second (diagnostic) camera. The second camera provides near-field and far-field beam viewing, while a radiometer and a pulse detector provide additional diagnostic information. The beamfinder assembly also provides receiver-field laser viewing for receiver-path boresight adjustments. In an exemplary embodiment, the beamfinder assembly includes a quad step-filter constructed from circular wedge filters.

U.S. Pat. No. 6,122,106, "Displaced aperture beamsplitter for laser transmitter/receiver opto-mechanical system," describes a single aperture opto-mechanical system for transmitting two small-aperture laser beams and a single received laser beam. The two pencil-thin transmitted beams are co-aligned within 150 micro-radians in the same direction but have optical axes that are displaced laterally. An in-coming beam is received along a path that is essentially parallel with the path of the transmitted beams within 500 micro-radians. The small-aperture transmitted beams each pass through a hole in a metal mirror beamsplitter that is positioned to reflect the received light energy at a 90 E angle through a narrow band-pass filter and focused by an aspheric glass lens that directs the received beam energy onto a receiver detector. The beamsplitter has indexing features that provide self-alignment of the beamsplitter to the laser mount.

U.S. Pat. No. 5,991,015, "Beam monitoring assembly," describes a beam monitoring assembly that provides near-field imaging, far-field imaging and power measurements of a laser beam in real-time for alignment and performance verification purposes. The monitoring assembly includes a holographic beam splitter that splits the laser beam from the laser resonator cavity into a series of separate split beams having varying beam powers. One of the split beams is directed to a power meter to measure the power of the beam. One of the split beams is directed to a near-field camera that provides a near-field image of the beam. Another one of the split beams is directed to a heat dump that absorbs and removes the beam's energy from the assembly. Another one of the split beams is directed to a far-field lens that focuses the split beam onto a far-field camera that provides a far-field image of the beam. The near-field and far-field images of the beam are displayed on an operator control panel in real time. Suitable computer electronics and camera electronics are provided to process the electrical signals from the power meter and the cameras.

Japanese Patent JP62,273,503, "Laser alignment measuring instrument," describes a laser alignment detector including a screen with scale marks, lighting device, partially transmitting mirror which partially transmits rays of light, image pickup element placed on the reflecting optical axis of the mirror, and box body which intercepts outside light and houses the screen, mirror, lighting device, and image pickup element. An incident laser beam passes through an optical filter for adjusting light quantity and reaches a half mirror, which is a partially transmitting mirror. The transmittance of the half mirror is about 30% and a non-reflective coating is performed on one side of the mirror for preventing the ghost of the laser beam. About 50% quantity of the laser beam reflected by the half mirror is absorbed into a box body, which is plated to a black color. The transmitted laser beam hits a screen with scale marks and the laser pattern is monitored by a CCD camera through the half mirror. An optical filter for adjusting light quantity is provided in front of the CCD camera containing an image pickup element and LEDs are provided beside the screen as lighting devices for illuminating the scale marks, so that the scale marks on the screen can be seen with the CCD camera. Therefore, the compact laser alignment-measuring instrument can be obtained.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). Along with a wide variety of potential applications for ultrafast and short pulse lasers in medicine, chemistry, and communications, short pulse lasers are also useful in milling or drilling holes in a wide range of materials. In this regard, hole sizes in the sub-micron range are readily drilled by these lasers. High aspect ratio holes are also drilled in hard materials; applications in this regard include cooling channels in turbine blades, nozzles in ink-jet printers, and via holes in printed circuit boards.

Parallel processing of laser-milled holes is a key technique for increasing throughput in laser micromachining.

Beamsplitting devices (beamsplitters) such as diffractive optical elements (DOEs) are used in laser micromachining to divide a single beam into multiple beams and thereby achieve parallel machining. However, such use of beamsplitters introduces technical challenges in hole geometry requirements and in the ability to produce consistent, repeatable results. Such challenges need to be overcome in order to maintain consistency and repeatability in laser milling.

The primary advantage of a parallel process laser drilling system over a single beam laser drilling system is the efficiency gain in processing time. Parallel process drilling systems drill many holes in the same amount of time that a single beam laser drilling system drills just one hole. The repeatability and quality of the parallel-processed holes is important to create a product that meets the required specifications. Any variation in beam intensity or in alignment between sub-beams causes a parallel process laser drilling system to drill misshapen holes, creating a product that does not meet specifications.

Alignment of microfilters to the sub-beam pattern is critical in producing a drilled workpiece that meets final specification. The microfilter needs to be adjusted in terms of position and focus to achieve these specifications. However, current methods for adjusting microfilters are complex and time consuming, and therefore not cost efficient.

What is needed is a way to increase the performance of a parallel process laser drilling system by being able to rapidly and optimally align a microfilter within a parallel process laser drilling system when alignment is required. Fullfilling this need requires a way to simultaneously align a plurality of beams with a microfilter in a parallel process laser drilling system and also a way to determine the degree and nature of misalignment of the sub-beams. The present invention provides a solution to these needs.

SUMMARY OF THE INVENTION

According to the present invention, a laser drilling system includes an imaging device illuminated by at least two sub-beams of the laser drilling system, including a first sub-beam and a second sub-beam, a microfilter intersecting beam paths of the first sub-beam and the second sub-beam, and a display communicating an image from the imaging device to an operator of the laser drilling system.

A number of advantages are provided with the invention. For example, equalizing the sub-beam intensity and aligning sub-beams through a microfilter increases the performance of a parallel process laser drilling system. A way is also provided to align and confirm alignment of a microfilter in such a drilling system toward an optimal alignment of the sub-beams. Another advantage of the present invention relates to determining the degree and nature of misalignment in a microfilter respective to the sub-beams of a parallel process laser drilling system. The present invention also provides a way to align beams outside of the visible-spectrum (e.g., infrared beams).

The ability to align a microfilter with the sub-beams of a parallel process laser drilling system without disturbing the optical alignment of the other system elements is yet another benefit. Finally, the basic invention provides a way to align a microfilter with the sub-beams of a parallel process laser drilling system with a CCD camera without damaging the CCD camera with the high power laser beams.

In a preferred form of the invention, a further benefit of using a microfilter with a reflective coating is that a way is provided to optimize the contrast between the sub-beams' incidence location upon the transmissive disks of the microfilter and the sub-beams' incidence location upon the reflective coating of the microfilter, thus providing an improved alignment means in a parallel process laser drilling system. In a preferred use, print resolution in inkjet printers is also realized when the inkjet nozzles of the printer are manufactured with the benefit of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Microfilters are used to correct for inconsistencies in sub-beam intensity to help resolve the technical challenges referenced above. However, the introduction of any new element to a laser drilling system requires careful alignment to ensure drilling quality. When aligning hundreds of sub-beams in a regular pattern to a patterned microfilter, there is a chance that any given sub-beam will be mis-aligned to the wrong part of the transmissive pattern. This type of error is not detected in a single-beam alignment procedure, in which, as long as a sub-beam is transmitted through a transmissive filter of the microfilter, it is difficult to discern if the individual sub-beam is aligned with its intended individual transmissive filter. However, when a set of sub-beams are to be aligned, the alignment issue between sub-beam and pattern can be avoided by measuring the alignment of all sub-beams simultaneously. A secondary benefit of simultaneous alignment is that the decreased time spent aligning the microfilter translates to a decreased operating cost and increased throughput of the laser drilling system.

In overview, the preferred embodiments provide a microfilter alignment system that simultaneously aligns a microfilter using all the sub-beams filtered by it in a parallel process laser drilling system. The aligning system includes a charge-coupled-device having a size large enough to capture images of all sub-beams simultaneously (hereinafter referred to as a large-format CCD camera), a microfilter, a PZT scan mirror, a diffractive optical element to split a single beam into a plurality of sub-beams, an image transfer lens, and at least one attenuator. The large-format CCD camera captures images of the sub-beams as they are moved in a pattern by the PZT scan mirror and transmitted through the microfilter. The sub-beams are aligned as a simultaneously transmitted group. The alignment approach includes reducing beam intensity with a second attenuator, placing a CCD camera in the imaging plane of the microfilter, guiding the sub-beams using the PZT mirror, measuring the alignment of the guided sub-beams upon the large-format CCD camera, and realigning the microfilter based on the measurement from the camera.

In a further embodiment, a highly reflective coating on the microfilter provides up to a twenty times higher contrast for sharply defining the edges of the transmissive filters pattern.

Figure 1:
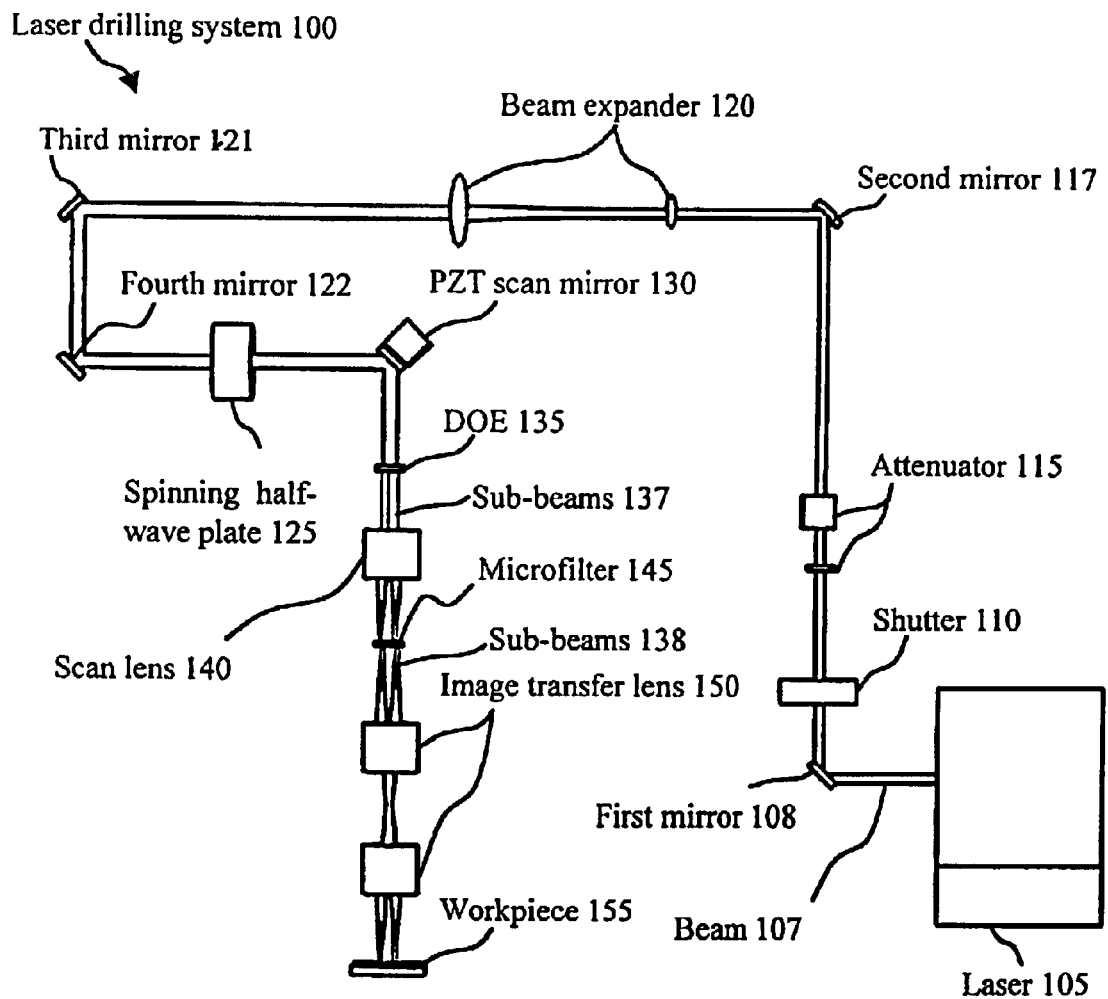
FIG. 1 presents a schematic of a laser drilling system.

Turning now to specific details in the preferred embodiments, FIG. 1 shows a simplified schematic of a laser drilling system 100, including a laser 105, a beam 107, a shutter 110, an attenuator 115, a beam expander 120, a spinning half-wave plate 125, a first mirror 108, a second mirror 117, a third mirror 121, a fourth mirror 122, a piezo electric transducer (PZT) scan mirror 130, a diffractive optical element (DOE) 135, a plurality of sub-beams 137, a plurality of sub-beams 138 a scan lens 140, a microfilter 145, an image transfer lens 150, and a workpiece 155, arranged as shown. All elements of laser drilling system 100 are conventional in laser micromachining.

Laser 105 is a conventional laser used for laser drilling. In one embodiment, laser 105 is a picosecond laser. However, laser 105 may be generalized for use with other lasers, such as excimer, $CO_2$, and copper vapor laser systems.

PZT scan mirror 130 implements a laser milling algorithm (not described here, but which should be apparent), and guides beam 107 to achieve the desired shape in workpiece 155. The specifications of PZT scan mirror 130 are selected in coordination with scan lens 140 according to the size and shape of the holes to be milled and the material of workpiece 155. In one embodiment, PZT scan mirror 130 is a high-resolution, small-range PZT tip-tilt mirror in the 1–3 mrad scan range.

DOE 135 acts as a highly efficient beamsplitter and beam array pattern generator enabling picosecond laser drilling system 100 to drill parallel holes in workpiece 155. The pattern of sub-beams 137 output by DOE 135 is predetermined by the specifications of the holes to be drilled in workpiece 155. In one embodiment, DOE 135 splits the single incident laser beam from laser 105 into 152 beams in the forms of 4 rows with 38 beams in each row. (This excimer/kinoform information is from Holmér and Hård's 1995 paper "Laser-machining experiment with an excimer laser and a kinoform" in Applied Optics which is hereby incorporated by reference herein).

Scan lens 140 determines the spot size of sub-beams 137 upon workpiece 155. The size of beam 107 that enters scan lens 140 is less than or equal to the pupil size of scan lens 140. Telecentricity is required to keep the incident angle between sub-beams 137 and workpiece 155 essentially perpendicular, a necessary angle for drilling parallel holes in workpiece 155. In a preferred embodiment, scan lens 140 is an f-theta telecentric (scan) lens. In alternate embodiments, where the axes of the holes do not need to be parallel to each other, a non-telecentric scan lens is used.

Microfilter 145 equalizes the uniformity of sub-beams 137 emitted from picosecond laser 105 through DOE 135. Microfilter 145 is made of dielectric coatings on a glass substrate and is custom designed and fabricated according to the intensity patterns of the sub-beams 137 from DOE 135. In one embodiment, microfilter 145 has two transmission values, 100% and 98%, in a pattern of 152 individual filters of 4 rows with 38 filters in each row that corresponds to the example given to DOE 135 above. In order to increase the contrast for better alignment, the background area of microfilter 145 is 100% reflective such that sub-beams 137 are only passed through the transmissive filters area. This 100% reflective coating improves the signal-to-noise ratio by at least a factor of twenty over a microfilter with an uncoated background for realizing the misalignment. In this embodiment, each of the individual transmissive filters is circular in shape with a diameter of 250 microns.

Image transfer lens 150 maintains image quality, spot size, and telecentricity, while preventing the blowback of ablated particles from workpiece 155 onto microfilter 145 by distancing workpiece 155 more than two additional focal lengths away from microfilter 145. These ablated particles damage microfilter 145 due to the proximity between microfilter 145 and workpiece 155 if image transfer lens 150 is not used. In one embodiment, image transfer lens 150 has two telecentric scan lenses, identical to scan lens 140, placed back to back, with the pupil planes of the two scan lenses coinciding in the middle.

Workpiece 155 is the target for picosecond laser drilling system 100. In one embodiment, workpiece 155 is a stainless steel inkjet nozzle foil; however, the present invention may be generalized to a variety of workpiece materials, such as polymers, semiconductor metals, or ceramics. In alternate embodiments, a picosecond laser drilling system 100 can drill holes of a wide variety of shapes and tapers in workpiece 155.

In operation, laser 105 emits beam 107 along the optical path identified in FIG. 1. Beam 107 propagates along the optical path to be incident upon first mirror 108. First mirror 108 redirects beam 107 along the optical path to be incident upon shutter 110. Shutter 110 opens and closes to selectively illuminate workpiece 155. Beam 107 exits shutter 110 and propagates along the optical path to attenuator 115. Attenuator 115 filters the energy of picosecond laser 105 in order to precisely control ablation parameters. Beam 107 exits attenuator 115 and propagates along the optical path to be incident upon second mirror 117. Second mirror 117 redirects beam 107 along the optical path to be incident upon beam expander 120.

Beam expander 120 increases the size of beam 107 to match the pupil size of scan lens 140. Beam 107 exits beam expander 120 and propagates along the optical path to be incident upon third mirror 121. Third mirror 121 redirects beam 107 along the optical path to be incident upon fourth mirror 122. Fourth mirror 122 redirects beam 107 along the optical path to be incident upon spinning half-wave plate 125. Spinning half-wave plate 125 changes the polarization of beam 107. Upon exiting spinning half-wave plate 125, beam 107 propagates along the optical path to be incident upon PZT scan mirror 130. PZT scan mirror 130 moves in a pre-defined pattern using a drilling algorithm (not shown) to drill the holes in workpiece 155. PZT scan mirror 130 redirects beam 107 along the optical path to be incident upon DOE 135. DOE 135 splits beam 107 into a plurality of sub-beams 137, which allow parallel drilling of workpiece 155. Sub-beams 137 exit DOE 135 and propagate along the optical path, where they are incident upon scan lens 140. Scan lens 140 determines the spot size of sub-beams 137 upon microfilter 145. Microfilter 145 equalizes the intensities of sub-beams 138. Sub-beams 138 exit microfilter 145 and propagate along the optical path, where they are incident upon image transfer lens 150. Image transfer lens 150 re-images the focal spots of sub-beams 138 onto workpiece 155. Sub-beams 138 ablate workpiece 155 in a pattern according to the pre-defined milling algorithm.

Turning now to further details in the present invention, a microfilter alignment system and method of using a large format charge-coupled device (CCD) camera with a display screen align a microfilter within a parallel process laser drilling system. The system includes a large format CCD camera and a laser drilling system (e.g., laser drilling system 100) with a PZT scan mirror, a DOE used to split a single beam into a plurality of sub-beams, an image transfer lens, and at least one attenuator. The method utilizes a CCD camera to image the drilling pattern and determine corrections for the microfilter alignment. Microfilter alignment is completed prior to drilling a workpiece with a parallel process laser drilling system (e.g., laser drilling system 100). In this regard, FIG. 2 presents the system for aligning a microfilter with the sub-beams of a parallel laser drilling system.

Figure 2:
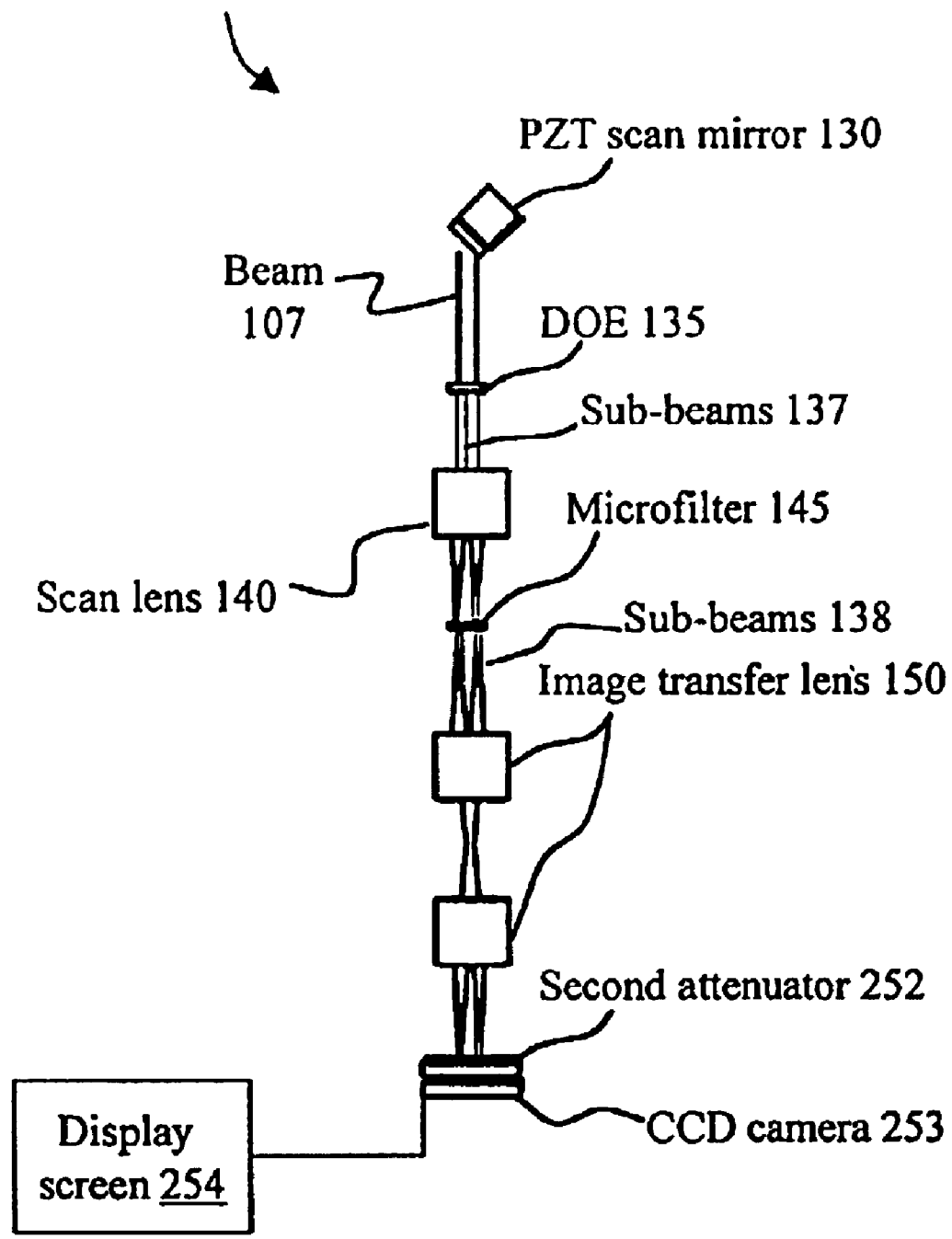
FIG. 2 shows shows an aligning system according to the present invention.

FIG. 2 shows an aligning system 200 including PZT scan mirror 130, beam 107, DOE 135, sub-beams 137, sub-beams 138, scan lens 140, microfilter 145, image transfer lens 150, a second attenuator 252, a CCD camera 253, and a display screen 254.

Second attenuator 252, CCD camera 253, and display screen 254 are used, as shown in aligning system 200, to perform the alignment of sub-beams 137 and microfilter 145, and are subsequently removed, without disturbing the alignment of the laser drilling system 100, to perform drilling. Aligning system 200 is identical to the elements shown in laser drilling system 100, except that workpiece 155 has been replaced with second attenuator 252, CCD camera 253 (at the target spot where cutting is normally performed), and display screen 254 in order to perform alignment of microfilter 145 prior to drilling.

Beam 107, DOE 135, sub-beams 137, sub-beams 138, scan lens 140, microfilter 145, and image transfer lens 150 function as described in laser drilling system 100.

PZT scan mirror 130 guides beam 107 in a pattern identical to the perimeter of the workpiece geometry eventually (after completing the alignment of microfilter 145) to be drilled in workpiece 155. In one embodiment, where microfilter 145 is aligned for use in laser drilling system 100 as it drills conical holes in an inkjet nozzle foil, PZT scan mirror 130 guides beam 107 in a circular pattern with a diameter equal to the entrance diameter of the conical hole to be drilled.

Microfilter 145 is placed near to, but outside, the focal plane of sub-beams 137, for two primary purposes. The first purpose is to ease the measurement of sub-beams 137 with CCD camera 253. Sub-beams 137 are larger in diameter outside the focal plane. When the distance offset is chosen properly, the effective coverage of the beam track matches the size and shape of the transmissive filters patterned on microfilter 145, and thus the alignment accuracy is greatly enhanced. The second purpose is to eliminate possible damage to microfilter 145 caused by sub-beams 138. Microfilter 145 is fastened to a translation stage with an X-Y-Z translation plus rotation (not shown but which should be apparent) enabling microfilter 145 to be moved and aligned within the optical path between scan lens 140 and image transfer lens 150. In one embodiment, microfilter 145 is glued to a manual rotational stage which is in turn mounted on an X-Y-Z translational stage. In another embodiment, microfilter 145 is fastened to a computer-controlled rotational and X-Y-Z translational stage that systematically adjusts the alignment of microfilter 145 based on alignment data received from CCD camera 253. In an alternate embodiment, microfilter 145 has a 100% reflective coating to enhance the contrast for realizing the edges of the transmissive filters pattern.

Second attenuator 252 is used to reduce the laser energy of sub-beams 138 before sub-beams 138 are incident upon CCD camera 253. Second attenuator 252 is necessary to prevent the laser energy of sub-beams 138 (e.g., the energy level normally used by sub-beams 138 for drilling) from saturating or damaging CCD camera 253. If CCD camera 253 becomes saturated, alignment details are not discernable. Second attenuator 252 is a piece of Schott glass of fixed optical density placed after image transfer lens 150, against CCD camera 253. Second attenuator 252 is placed directly against the CCD camera 253 to block ambient light from being detected simultaneously.

CCD camera 253 is a large-format CCD camera with a pixel array (used for image capturing) equal to or larger than the target pattern of the laser drilling system upon workpiece 155. In one embodiment of drilling inkjet nozzles, the target pattern is 13 mm by 12 mm. CCD camera 253 is used to measure the alignment of all sub-beams 138 simultaneously. CCD camera 253 is a large-format CCD camera such as those manufactured by Apogee Instruments, Incorporated. The individual pixel size of CCD camera 253 must be small enough to resolve the circular path of the individual sub-beams 138 and should, therefore, be roughly equivalent to the diameter of sub-beams 138. In one embodiment, sub-beams 138 have a 10-micron diameter, and CCD camera 253 has a corresponding pixel size of 9 microns.

Display screen 254 is a conventional computer monitor. Display screen 254 is used to image sub-beams 138 as they are incident upon CCD camera 253. In one embodiment, a "frame-grabber interface card" transports pixel-to-pixel images from CCD camera 253 to a computer (not shown), and the computer digitally processes the image and displays the result on display screen 254. Ability to digitally zoom-in, zoom-out, and process the images is essential to fully utilize the resolution of the large area CCD camera 253. In an alternate embodiment, in which a computer adjusts microfilter 145 systematically, display screen 254 is not a required element.

In operation, shutter 110 of drilling laser 105 is opened and beam 107 propagates along an optical path through optical elements in a laser drilling system (e.g., laser drilling system 100) until it is incident upon PZT scan mirror 130. PZT scan mirror 130 directs beam 107 in a pattern along the optical path towards DOE 135. Beam 107 propagates along the optical path to be incident upon DOE 135. DOE 135 splits beam 107 into sub-beams 137, to allow for the parallel drilling of workpiece 155. Sub-beams 137 exit DOE 135 and propagate along the optical path, where they are incident upon scan lens 140. Scan lens 140 determines the final spot size of sub-beams 137 upon workpiece 155. Sub-beams 137 exit scan lens 140 and propagate along the optical path, where they are incident upon microfilter 145. Microfilter 145 equalizes the intensities of sub-beams 138. Sub-beams 138 exit microfilter 145 and propagate along the optical path, where they are incident upon image transfer lens 150. Image transfer lens 150 re-images the focal spots of sub-beams 138 onto second attenuator 252. Second attenuator 252 reduces the laser energy of sub-beams 138. Sub-beams 138 exit second attenuator 252 and are incident upon CCD camera 253. The pattern of sub-beams 138 is captured by CCD camera 253 and shown on display screen 254. Based on the pattern and appearance of patterning sub-beams 138, the position and alignment of microfilter 145 is adjusted to ensure alignment of microfilter 145 and all sub-beams 138. The spatial movement (X-Y-Z direction and rotation) required to align microfilter 145 with sub-beams 138 is discernable from the pattern of sub-beams 138 as captured by CCD camera 253 and shown on display screen 254. This concept is illustrated in FIGS. 3A and 3B below.

Figure 3A:
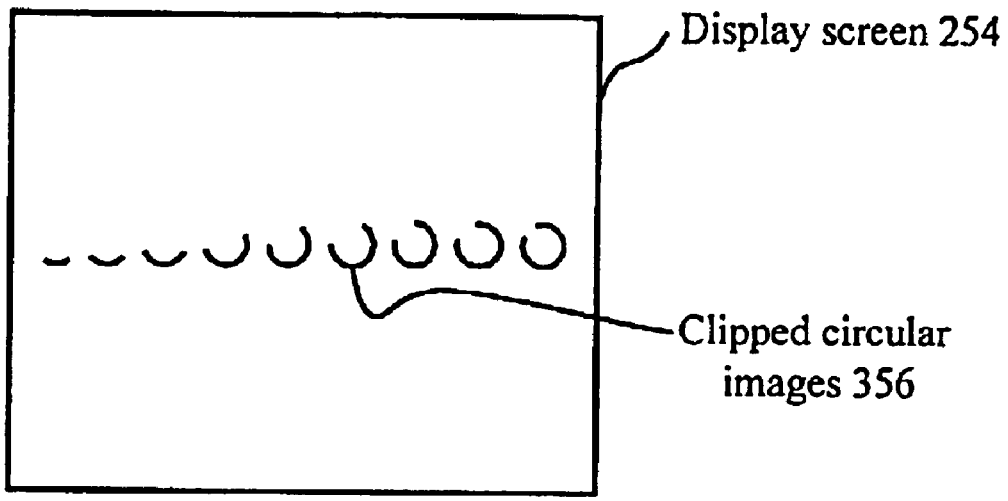
FIG. 3 (FIGS. 3A and 3B) shows a misaligned sub-beam pattern and an aligned sub-beam pattern.
Figure 3B:
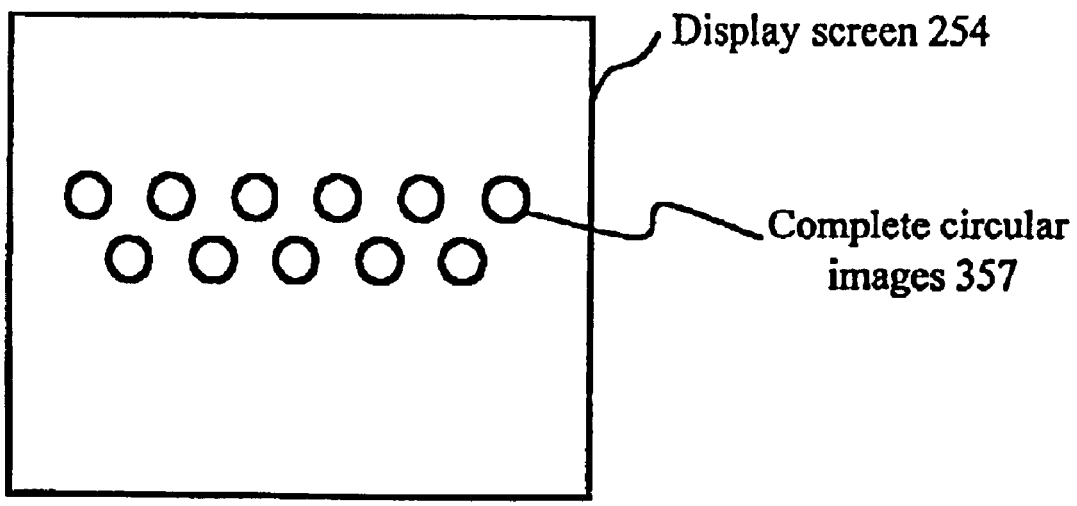

FIG. 3A shows an example of using aligning system 200 in which sub-beams 138 are shaped as circles, travel through misaligned microfilter 145, are captured by CCD camera 253, and are displayed on display screen 254. In FIG. 3A, a plurality of clipped circular images 356 show that sections of the circled pattern of sub-beams 138 have been "clipped" by the edges of the transmissive disk patterns in microfilter 145; therefore, microfilter 145 is not aligned with sub-beams 138. Microfilter 145 is then translated and rotated until microfilter 145 is aligned with sub-beams 138 to create a plurality of complete circular images 357 on display screen 254, as shown in FIG. 3B.

Figure 4:
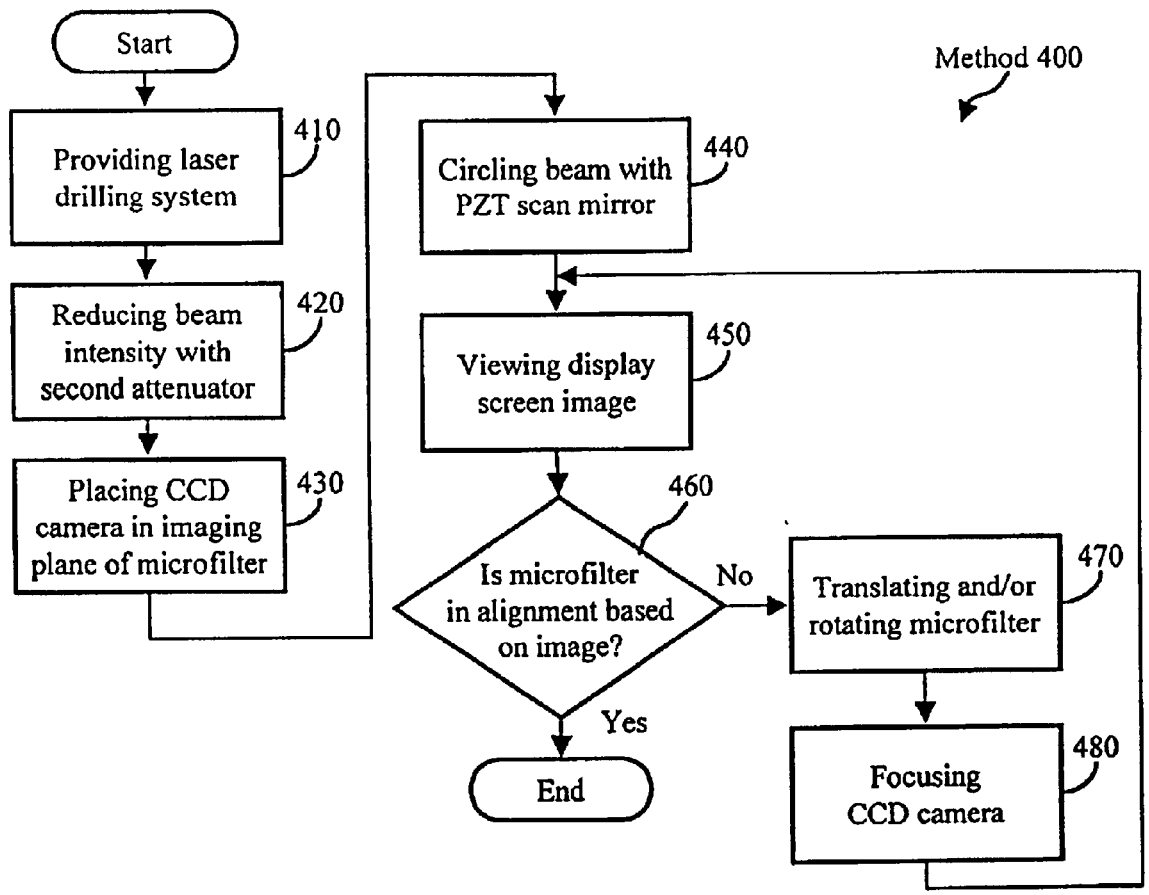
FIG. 4 illustrates a method for aligning a microfilter with the sub-beams of a parallel process laser drilling system.

FIG. 4 illustrates a method 400 of aligning microfilter 145 with sub-beams 137 of a parallel process laser drilling system (e.g., laser drilling system 100), including the following steps:

In step 410, providing laser drilling system, a laser drilling system with a specific set of minimally required elements is provided. The minimally required elements, as shown in aligning system 200, include PZT scan mirror 130, beam 107, DOE 135, sub-beams 137, sub-beams 138, scan lens 140, microfilter 145, image transfer lens 150, second attenuator 252, CCD camera 253, and display screen 254.

Shutter 110 of drilling laser 105 is opened, and attenuator 115 is adjusted to a proper level. Microfilter 145 is placed and roughly aligned using an infrared viewer (not shown but which should be apparent) within aligning system 200. In one example, microfilter 145 is aligned to a range of 100 microns with this infrared viewer.

In step 420, reducing beam intensity with second attenuator, second attenuator 252 reduces the intensity of sub-beams 138 to prevent sub-beams 138 from saturating CCD camera 253 such that the images would be unusable for alignment purposes, and also to prevent damage to CCD camera 253.

In step 430, placing CCD camera in imaging plane of microfilter, CCD camera 253 is placed in the imaging (or conjugate) plane of microfilter 145. CCD camera 253 must be placed in the imaging plane of microfilter 145 to capture the boundaries of circular sub-beams 138 generated from microfilter 145. This placement serves as an initial "rough" focusing to be improved later in method 400. In one embodiment, the rough focusing of CCD camera 253 using laser drilling system 100 is typically accurate to within 1 mm of the true imaging plane at this step.

In step 440, circling beam with PZT scan mirror, PZT scan mirror 130 moves in such a manner as to circle beam 107 as it propagates through laser drilling system 100. PZT scan mirror 130 is programmed with a computer (not shown) to circle beam 107 until alignment is complete. The rate of circling is fast enough that a single exposure on CCD camera 253 reveals complete circles when alignment is achieved. In one embodiment, the rate is set to five circles per second while the CCD is exposed for 2 seconds for each frame.

In a general embodiment, PZT scan mirror 130 circles beam 107 to create a circular pattern with a diameter greater than or equal to the size of the hole to be drilled in workpiece 155 to ensure that, when drilling to create a specified workpiece geometry, none of sub-beams 138 will be clipped by the edges of the individual filters in microfilter 145.

In a specific embodiment, PZT scan mirror 130 circles sub-beam 137 (with a 30-micron diameter) in a 100-micron diameter circle through the 250-micron individual filters in microfilter 145.

In step 450, viewing display screen image, a laser system operator uses display screen 254 to view the images of circling sub-beams 137 that successfully pass through microfilter 145 and are incident upon CCD camera 253. Frames with two-second exposure time are transferred to display screen 254 to view the circular tracks of sub-beam 137 In an alternate embodiment where microfilter 145 is adjusted systematically by a computer, step 450 is not required.

Figure 5:
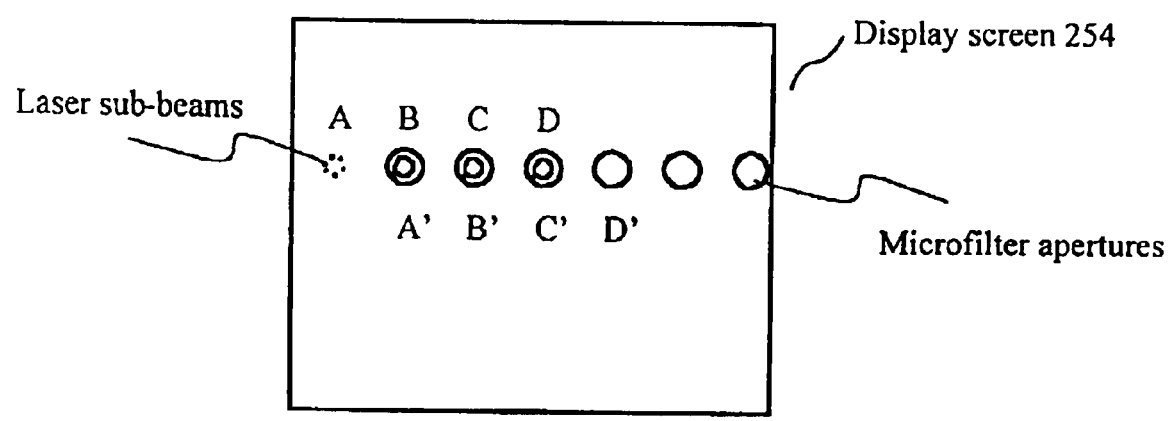
FIG. 5 shows an example of misalignment of a microfilter from shifting one sub-beam.

FIG. 5 presents an example of misalignment of a microfilter from shifting of one sub-beam. Sub-beam A is blocked by the microfilter while other sub-beams pass through the microfilter apertures. In step 460, decision as to microfilter alignment based on image, the laser system operator analyzes the images on display screen 254 and determines whether microfilter 145 is in alignment with sub-beams 138. The system operator monitors possible interval shifts for patterns with some regularity. For hole patterns where the holes are regularly spaced, situations can happen where the microfilter is shifted by an integer number of holes from the beam pattern, but the majority of the laser beams still pass the microfilter. As an example (see FIG. 5), a row of regularly spaced laser sub-beams labeled A, B, C, D, . . . are correctly aligned when they pass the corresponding regularly spaced microfilter apertures labeled A', B', C', D', . . . . However, a situation may happen where the sub-beams are misaligned and shifted by one hole, i.e., sub-beam B passes A', sub-beam C passes B', sub-beam D passes C', etc., but sub-beam A is blocked by the microfilter, as shown in FIG. 5. This misalignment can only be detected by zooming out to view the entire hole pattern on display screen 254 and by counting the number of sub-beams to make sure the the correct number of sub-beams are present.

Returning to FIG. 4, if microfilter 145 is misaligned, the image of sub-beams 138 shows clipped circular paths 356, as shown in FIG. 3A, and method 400 proceeds to step 470. If the image of sub-beams 138 on display screen 254 shows complete circular paths 357 with all sub-beams 138 present, as shown in FIG. 3B, microfilter 145 is in alignment with all sub-beams 138, and method 400 ends.

In step 470, translating and/or rotating microfilter, the laser system operator translates and/or rotates the rotational stage of microfilter 145 into a position closer to alignment based on the pattern of clipped circular paths 356 on display screen 254. In one embodiment, the system operator manually adjusts the position of microfilter 145 by turning a knob(s) on a manual rotational stage that holds microfilter 145. In an alternate embodiment, a computer (not shown) adjusts a mechanical rotational stage holding microfilter 145 based on the alignment data captured by CCD camera 253. The computer receives data from CCD camera 253 regarding the pattern of clipped circular paths 356 incident upon CCD camera 253, and adjusts the position of microfilter 145 based on that data.

In step 480, focusing CCD camera, CCD camera 253 is moved forward or backward within the optical path to compensate if there is no focusing mechanism within CCD camera 253. If CCD camera 253 does contain a focusing lens or other focusing mechanism, CCD camera 253 is not moved, but focused either manually or electronically.

The system and method of the present invention are used to align a microfilter article that is specifically designed to equalize intensity of sub-beams within a parallel process laser drilling system.

The system and method of the present invention are also used to produce an inkjet nozzle article with improved workpiece geometry, uniformity, and repeatability via use of the aligned microfilter designed to equalize intensity of sub-beams within a parallel process laser drilling system. In this regard, a nozzle plate of an ink-jet head may be constructed with the laser drilling system of the present invention as further detailed in FIGS. 6 and 7.

Figure 6:
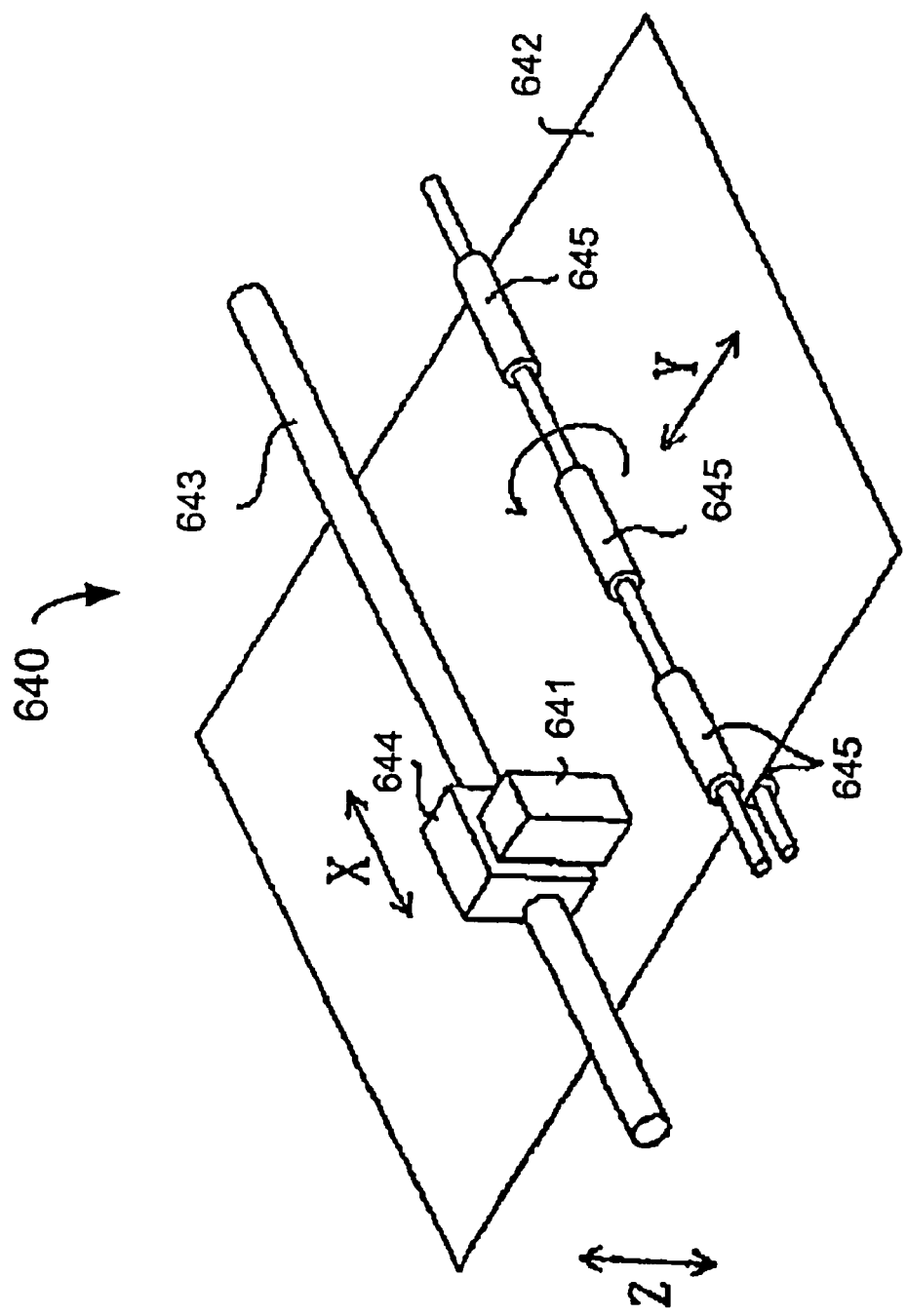
FIG. 6 provides a perspective view showing major constituent components of an ink-jet printer.

As shown in FIG. 6, an ink-jet printer 640 has an ink-jet head 641 capable of recording on a recording medium 642 via a pressure generator. Ink droplets emitted from ink-jet head 641 are deposited on the recording medium 642, such as a sheet of copy paper, so that recording can be performed on the recording medium 642.

The ink-jet head 641 is mounted on a carriage 644 capable of reciprocating movement along a carriage shaft 643. More specifically, the ink-jet head 641 is structured such that it can reciprocate in a primary scanning direction X in parallel with the carriage shaft 643. The recording medium 642 is timely conveyed by rollers 645 in a secondary scanning direction Y. The ink-jet head 641 and the recording medium 642 are relatively moved by the rollers 645.

Figure 7:
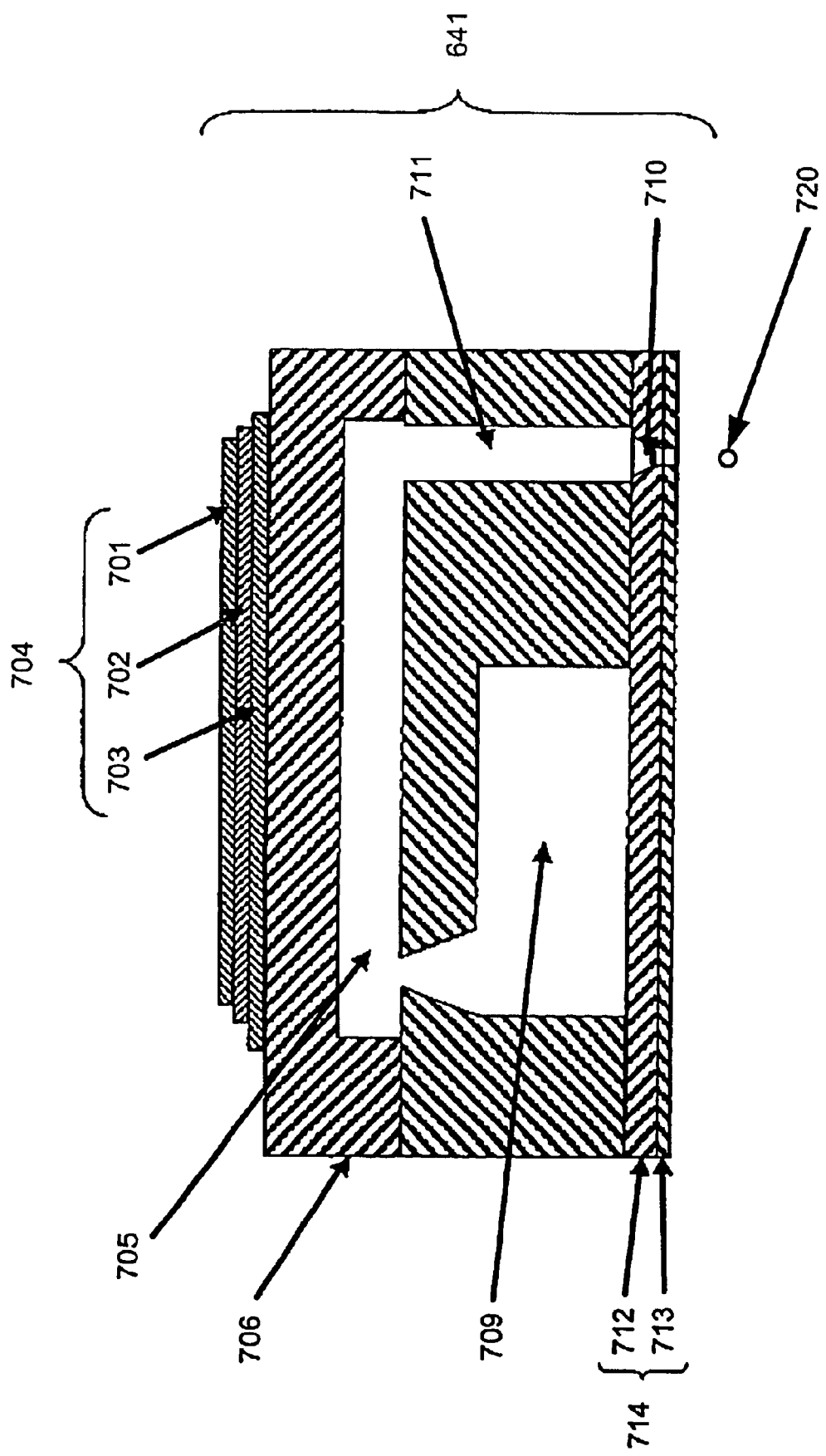
FIG. 7 provides a schematic cross-sectional view of an ink-jet head.

Turning now to FIG. 7, further details in in-jet head 641 are shown. Pressure generator 704 is preferably a piezoelectric system, a thermal system, and/or equivalent system. In this embodiment, the pressure generator 704 corresponds to a piezoelectric system which comprises an upper electrode 701, a piezoelectric element 702, and an under electrode 703.

A nozzle plate 714 (an instance of workpiece 155) comprises a nozzle substrate 712 and a water repellent layer 713. The nozzle substrate 712 is made of metal, resin and/or equivalent material. The water repellant layer is made of fluororesin or silicone resin. In this embodiment, the nozzle substrate 712 is made of stainless steel and has a thickness of 50 um, and the water repellent layer is made of a fluororesin and has a thickness of 0.1 um.

The ink-jet ink is filled in an ink supplying passage 709, a pressure chamber 705, an ink passage 711, a nozzle 710. Ink droplets 720 are ejected from nozzle 710 as pressure generator 704 pushes on pressure chamber element 706.

As a result of the present invention, very good nozzles are formed without flash and foreign matter (carbon etc) in the nozzle plate. Further, the accuracy of the nozzle outlet diameter is 20 um±1.5 um (a preferred predefined acceptable threshold value for tolerance between the perimeter and the excision edge of the 20 um diameter nozzle outlet).

From the foregoing it will be understood that the present invention provides an alignment system and method for aligning a microfilter which is then used in a system cutting a workpiece with a laser cutting tool with a high degree of precision in the quality of the conformance of the dimensions of the removed portion to the dimensions of the design used in the cutting operation with special value in using a laser to mill exit holes in inkjet nozzles. While the invention has been described in its presently preferred form, it will be understood that the invention is capable of certain modification without departing from the spirit of the invention as set forth in the appended claims.

What is claimed is:

1. A microfilter alignment method for use with a laser drilling system, comprising:

illuminating an imaging device with a first sub-beam of the laser drilling system;

illuminating the imaging device with a second sub-beam of the laser drilling system; and simultaneously aligning a microfilter with the first sub-beam and the second sub-beam.

2. The method of claim 1 comprising reducing intensity of the first sub-beam with an attenuator.

3. The method of claim 1 comprising placing the imaging device in the imaging plane of the microfilter.

4. The method of claim 1 comprising circling a sub-beam.

5. The method of claim 1 comprising viewing a display communicating an image from the imaging device.

6. The method of claim 1 comprising determining the alignment of the microfilter against moving sub-beams upon the imaging device.

7. The method of claim 1 comprising translating the microfilter based on feedback from the imaging device.

8. The method of claim 1 comprising rotating the microfilter based on feedback from the imaging device.

9. The method of claim 1 comprising focusing the imaging device to confirm alignment of the microfilter.

10. The method of claim 1 comprising illuminating a diffractive optical element with a laser beam of the laser drilling system, thereby producing the first sub-beam and the second sub-beam.

11. A laser drilling system including a microfilter aligned according to the method of claim 1.

12. A laser-milled workpiece drilled by a laser drilling system according to claim 11.

* * * * *

UNITED STATES PATENT AND TRADEMARK OFFICE
CERTIFICATE OF CORRECTION

PATENT NO. : 6,803,539 B2
DATED : October 12, 2004
INVENTOR(S) : Liu et al.

It is certified that error appears in the above-identified patent and that said Letters Patent is hereby corrected as shown below:

Title page,
Item [73], Assignee, "Matsushita Electrical Industrial Co., Ltd., Osaka (JP)" should be -- Matsushita Electric Industral Co., Ltd., Osaka (JP) --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,803,539 B2
DATED : October 12, 2004
INVENTOR(S) : Liu et al.

It is certified that error appears in the above-identified patent and that said Letters Patent is hereby corrected as shown below:

Title page,
Item [73], Assignee, "Matsushita Electrical Industrial Co., Ltd., Osaka (JP)" should be -- Matsushita Electric Industral Co., Ltd., Osaka (JP) --

Column 12,
Line 51, insert claims 13 and 14,
-- 13. The laser-milled workpiece according to claim 12, the workpiece comprising a workpiece layer having a plurality of apertures simultaneously laser-milled therethrough via parallel sub-beams of a laser drilling system, wherein an intensity distribution of the parallel sub-beams is equalized via a microfilter intersecting beam paths of the sub-beams, wherein said workpiece layer corresponds to an inkjet nozzle plate, and the plurality of apertures corresponds to a plurality of inkjet nozzles formed in the inkjet nozzle plate.

14. An injet nozzle comprising a portion of the workpiece of claim 13. --

This certificate supersedes Certificate of Correction issued April 26, 2005.

Signed and Sealed this

Ninth Day of August, 2005

JON W. DUDAS
*Director of the United States Patent and Trademark Office*